C. E. BATES.
Tobacco Transplanters.
No. 140,806. Patented July 15, 1873.
Fig. 1.
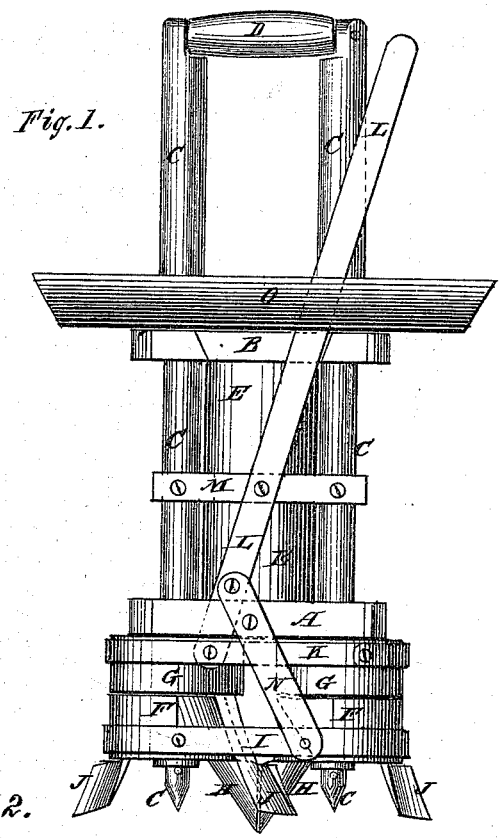
Fig. 6.
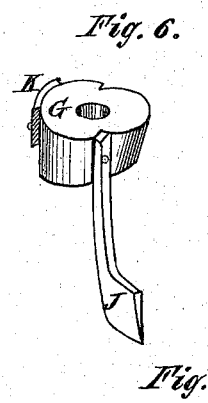
Fig. 5.
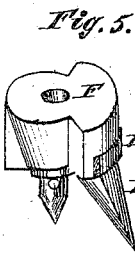
Fig. 2. Fig. 3.
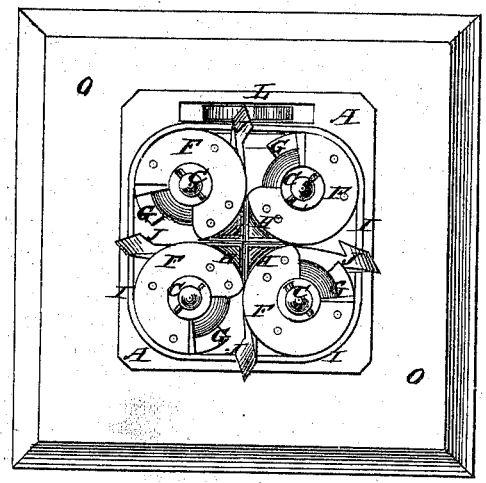 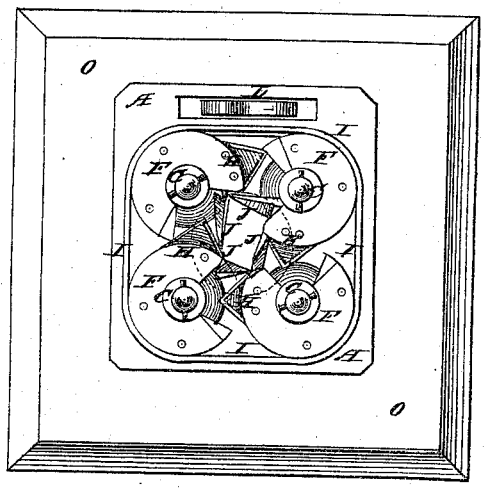
Fig. 4.
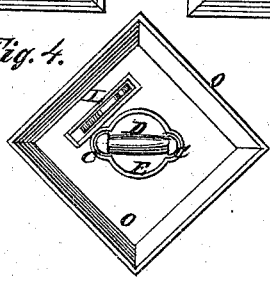
Witnesses:
P. C. Dietrich
[signature]
Inventor:
C. E. Bates
Per [signature]
Attorneys.

UNITED STATES PATENT OFFICE.

CLEMENT E. BATES, OF SOUTH DEERFIELD, MASSACHUSETTS.

IMPROVEMENT IN TOBACCO-TRANSPLANTERS.

Specification forming part of Letters Patent No. 140,806, dated July 15, 1873; application filed April 12, 1873.

*To all whom it may concern:*

Be it known that I, CLEMENT E. BATES, of South Deerfield, in the county of Franklin and State of Massachusetts, have invented a new and useful Improvement in Tobacco-Transplanter, of which the following is a specification:

Figure 1 is a side view of my improved transplanter. Fig. 2 is a bottom view of the same arranged for holding the plant and inserting it in the ground. Fig. 3 is a bottom view of the same arranged for leaving the plant in the ground and pressing the soil around it. Fig. 4 is a top view of the same. Fig. 5 is a perspective view of one of the lower wheels and its section of the cup. Fig. 6 is a perspective view of one of the upper wheels and its paddle.

Similar letters of reference indicate corresponding parts.

My invention has for its object to furnish an improved machine for transplanting tobacco-plants, which shall be neat in appearance, simple in construction, convenient in use, and effective in operation. The invention consists in the plates constructed in the form of sections of a hollow cone, and operating in connection with the wheels, as hereinafter fully described; in the paddles, constructed and operating in connection with the wheels, as hereinafter fully described; in the compound lever constructed and arranged to operate in connection with the two belts or chains, the two sets of wheels, the conical plates, and the paddles, as hereinafter fully described; in the combination of the two platforms, the posts, the handle, the tube, the two sets of wheels, the conical plates, the paddles, the two belts or chains, and the compound lever with each other, as hereinafter fully described and set forth.

A is the lower and B is the upper plate or platform of the machine, which are connected to each other by four short posts, C, two of which project above the upper plate B, and are connected by a round or bar, D, which serves as a handle when carrying and using the machine. In the centers of the plates A B are formed round holes of sufficient size to allow a tobacco-plant to pass through freely, and in which are secured the ends of a tin tube, E, through which the plants slide. The lower ends of the four posts C project below the lower platform A, and each of said projecting ends serves as a journal for the two wheels or short cylinders F G. To each of the lower wheels F is attached a plate, H, made in the form of a quarter of a cone in such a way that when the wheels F are turned into the position shown in Figs. 1 and 2 the plates H may have their side edges in contact, or nearly so, and their convex sides inward, so as to form upon their inner sides a cup to carry a plant, and upon their outer sides a square pyramid with concave sides, to serve as an instrument for forming a hole in the ground to receive the plant. The wheels F are connected by a band or chain, I, which is attached to each of said wheels at a single point, so that the wheels F may all be moved together. A portion of each of the wheels F G is cut away, as shown in Figs. 2 and 3, to get space for the paddles J, the upper ends of which are attached to the shoulders thus formed upon the upper wheels G. The paddles J are so arranged that when the plates H are brought together the paddles J will project outward, as shown in Figs. 1 and 2. The upper wheels G are connected by an endless band or chain, K, which is connected with each of said wheels at one point, so that the said wheels G may all move together. L is a lever, the lower end of which is pivoted to the belt or chain K of the upper wheels G. The lever L passes up through a slot in the lower platform A, is pivoted to a bar, M, attached to two of the posts C, and its upper end projects so as to be about upon a level with the handle D. To the lever L, a little above the lower platform A, is pivoted the upper end of a short lever, N, which is pivoted to said platform A, and the lower end of which is pivoted to the lower belt or chain I. By this arrangement, as the upper end of the lever L is moved in one or the other direction the two sets of wheels F G will be turned at the same time, and in opposite directions. O is a pan having a slot formed in its center for the handle D and the upper parts of the two posts C to pass through, and also a slot for the lever L to pass through and work in, so that the pan O may be set upon the upper platform B, the handle and lever projecting through and above it. The middle part of the slot for the handle is enlarged to correspond with the tube E. The pan O is flanged around its outer edge and around its slots, and is designed to serve as a receptacle for the plants to be set in the ground.

In using the machine, one of the pans O, a number of which have been previously supplied with plants, is placed upon the upper platform B, the handle D is grasped by the left hand, the lever L is pushed forward into the position shown in Fig. 1, and a plant is dropped through the tube E to rest in the cup formed by the plates H. The instrument is then pressed down upon the ground and the lever L drawn to the rearward. This forces the plates H outward and edgewise through the soil, and at the same time moves the paddles inward and sidewise through the soil, pressing said soil around the roots of the plant. The instrument is then raised from the ground, the lever L pushed forward, another plant inserted in the tube, and so on.

Having thus described my invention, I claim as new and desire to secure by Letters Patent—

1. In a transplanter, the combination of opening-plates H with horizontally-rotating wheels F, substantially as and for the purpose specified.

2. In a transplanter, the combination of covering-paddles J and wheels G with blades H and wheels F, all operating as specified.

3. The levers L N, belts or chains I K, wheels G, paddles J, wheels F, and blades H, combined and operating substantially as described.

CLEMENT E. BATES.

Witnesses:
ANDREW BAYLIES,
W. D. BATES.